US006718897B1

(12) United States Patent
De Bello

(10) Patent No.: US 6,718,897 B1
(45) Date of Patent: Apr. 13, 2004

(54) RIDEABLE WAVE PROPELLED WATERSPORT BOARD

(76) Inventor: Joseph De Bello, P.O. Box 151, Morro Bay, CA (US) 93443

( * ) Notice: Subject to any disclaimer, the term of this patent is extended or adjusted under 35 U.S.C. 154(b) by 0 days.

(21) Appl. No.: 10/390,414

(22) Filed: Mar. 17, 2003

(51) Int. Cl.[7] .............................................. B63B 35/79
(52) U.S. Cl. ......................................... 114/74; 114/79
(58) Field of Search .................... 441/74, 79, 68; 114/39.14, 281, 288, 291

(56) References Cited

U.S. PATENT DOCUMENTS

| | | | | |
|---|---|---|---|---|
| 2,355,392 A | * | 8/1944 | Kirchner | 441/74 |
| 3,111,695 A | * | 11/1963 | Kelly, Jr. | 441/74 |
| 3,160,897 A | * | 12/1964 | Kelly, Jr. | 441/74 |
| 3,289,227 A | * | 12/1966 | Kelly, Jr. | 441/74 |
| 3,747,138 A | * | 7/1973 | Morgan | 441/74 |
| 3,761,980 A | * | 10/1973 | Silverstein | 441/68 |
| 3,874,315 A | * | 4/1975 | Wright | 114/67 A |
| 5,807,152 A | * | 9/1998 | Wojcik | 441/74 |
| 6,007,393 A | * | 12/1999 | Choiniere et al. | 441/74 |
| 6,059,621 A | * | 5/2000 | Vogel | 441/74 |
| 6,119,620 A | * | 9/2000 | Addison | 114/347 |
| 6,533,625 B1 | * | 3/2003 | Taylor | 441/68 |
| 6,595,151 B2 | * | 7/2003 | Keller | 441/74 |

* cited by examiner

Primary Examiner—S. Joseph Morano
Assistant Examiner—Lars A. Olson
(74) Attorney, Agent, or Firm—Charles C. Logan, II

(57) ABSTRACT

A rideable wave propelled watersport board having an embodiment in the form of a surfboard and another embodiment in the form of a body board. Each board has an elongated body member having a front end, a left side edge, a right side edge and a rear end. The bottom surface of the boards has a plurality of longitudinally spaced steps formed in the bottom surface of the rear sixty percent of the length of the body member. The steps each have a front edge, a rear edge, a front wall and a longitudinal length. One or more fins extend downwardly from the bottom surface of the body member for the surfboard embodiment. Elongated strake members extend downwardly from the bottom surface of the step members. Usually there is a pair of laterally spaced strakes on each step and these strakes are positioned adjacent the respective left and right edges of the body member. The respective strakes are preferably positioned so that their longitudinal axis is slightly toed in toward the longitudinally extending central axis of the body member.

24 Claims, 2 Drawing Sheets

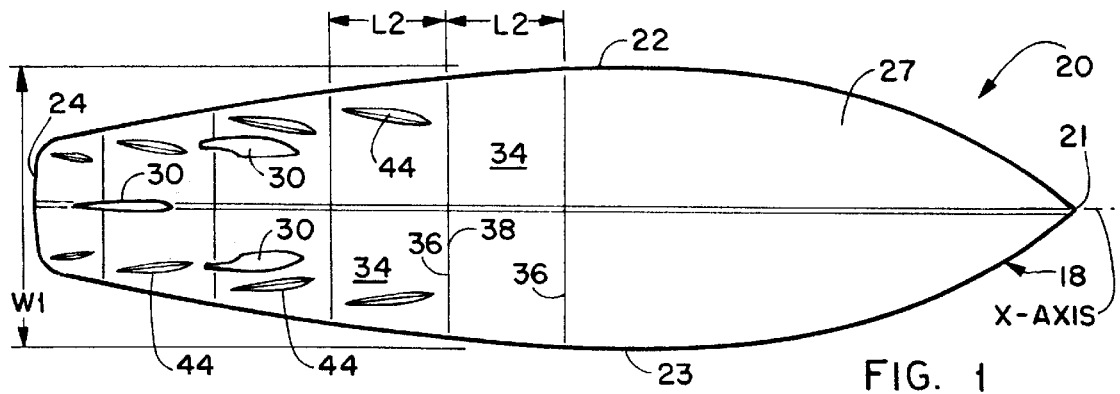
FIG. 1
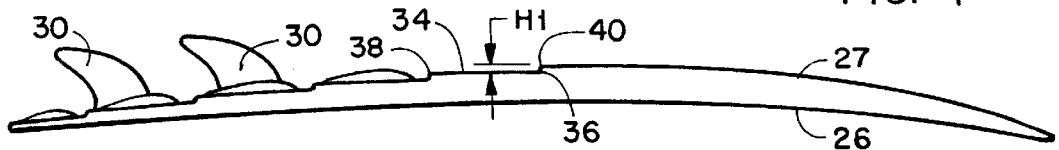
FIG. 2
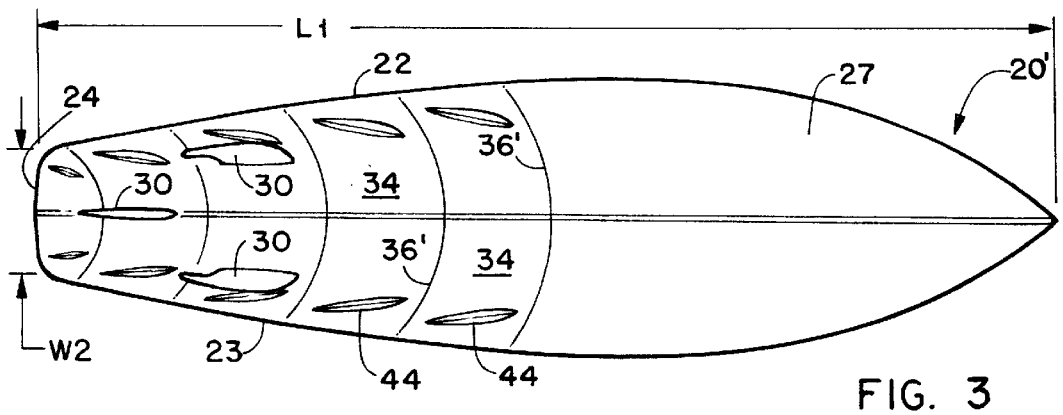
FIG. 3
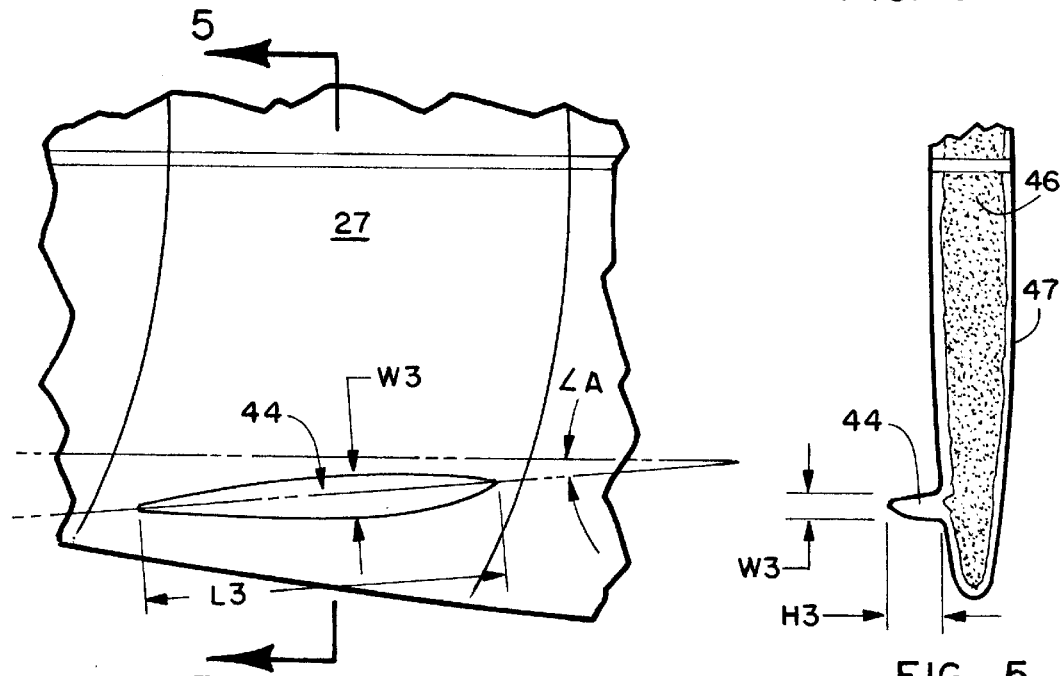
FIG. 4
FIG. 5

RIDEABLE WAVE PROPELLED WATERSPORT BOARD

BACKGROUND OF THE INVENTION

The invention relates to watersport boards and more specifically to surfboards and body boards. Conventional body boards have a bottom surface that is substantially planar. Surfboards, although not planar, usually have a smooth surface running from front to rear and from the left edge to the right edge of the bottom surface.

It is an object of the invention to provide a novel surfboard having structure on its bottom surface that reduces "wet surface areas" and increases speed.

It is also an object of the invention to provide a novel surfboard having structure on its bottom surface that will add additional lift that will allow the surfboard to plane sooner.

It is another object of the invention to provide strakes on the bottom surface of a surfboard to produce thrust when turning that accelerate forward movement.

It is a further object of the invention to provide a novel body board having structure on its bottom surface that reduces "wet surface areas" and increases speed.

It is an additional object of the invention to provide a novel body board having structure on its bottom surface that will add additional lift that will allow the surfboard to plane sooner.

It is another object of the invention to provide strakes on the bottom surface of a body board to produce thrust when turning that accelerate forward movement.

SUMMARY OF THE INVENTION

The novel watersport boards are able to obtain improved performance due to the stepped bottom surface of the boards and also due to the strakes that are connected to the bottom surface of the respective step members. The manner in which these individual structures improve the performance of the boards will be discussed individually below.

A stepped bottom surface creates lift thereby reducing specific gravity. The present state of the art surfboards and body boards depend on the physical properties of the foam material to maintain buoyancy. By forming steps on the bottom surface of these watersports boards, once they move forward in a wave the stepped bottom surface will add lift. This means getting speed sooner catching waves earlier or using more progressive equipment than usual for the riders weight thereby giving the rider a clear advantage. The stepped bottom surface also creates turbulence and produces bubbles thereby reducing wet surface and this reduces friction for increased speed and ease of acceleration. Additionally, the steps create an imposing plane to wave and swell direction thus helping to move the watersport board forward when attempting to catch a wave or during slow transition periods.

Normally, watersport board equipment is designed sleek and smooth (hydrodynamic) for the very purpose of creating as little turbulence as possible. In general, the more turbulence, the more friction and the result is a reduced speed. Because the inventor's stepped bottom surface design produces so much turbulence and bubbles, it literally introduces a whole new dynamic. Because of this dynamic, wet surface area is reduced. The result is less friction and more speed thereby producing a clear advantage for the rider. The strakes that extend downwardly from the bottom surface of the step members create direction of flow of the bubbles and turbulence away from the nose of the watersport board. Thrust or drive is produced when turning that accelerates forward movement. The strake is generally shallow in depth or height and relatively long with respect to its height and width. The strakes may be mistaken for fins because of the shape but their function is very different.

Boats have keels and rudders, airplanes have vertical stabilizers and rudders and most watersport boards have a fin or fins. These are all used for the same purpose, to direct a vehicle in a turn, usually in a pivot-like motion. Therefore watersport board fins are always longer than they are wide in order to pivot a turn in direction. There is a small amount of drive that is accomplished with a fin. This comes from the width of the fin or the rake in the fin (how much the fin is curved). The wider and more linear the fin template becomes, the more drive it will offer in the pivot. The fin will always be longer than it is wide in order to accomplish its major goal, to turn. This is not so with the inventor's strakes. The strakes will always be much longer than deep because they have a different purpose. They create "drive" not direction.

It has been found that the preferred location of the strakes is important for obtaining its best performance. The strakes would be located on the bottom surface of the step members and the trailing edge of the strakes should be kept close to the rail or edge of the body member. The front end of the strakes are toed-in order to keep the watersport board from tracking and sticking. The strakes may also be canted at an acute angle away from the center of the watersport board.

DESCRIPTION OF THE DRAWINGS

FIG. 1 is a bottom plan view of a first surfboard embodiment wherein the front edge of the step member is a straight line substantially perpendicular to the longitudinal axis of the surfboard;

FIG. 2 is a left side elevation view of the surfboard illustrated in FIG. 1;

FIG. 3 is a bottom plan view of a first alternative embodiment of the surfboard showing the front edge of each of the step members having a concave curvature with respect to the rear end of the surfboard;

FIG. 4 is an enlarged partial bottom plan view of one of the strakes extending downwardly from the bottom surface of one of the step members;

FIG. 5 is a cross sectional view taken along lines 5—5 of FIG. 4;

DESCRIPTION OF THE PREFERRED EMBODIMENT

Figure 6:
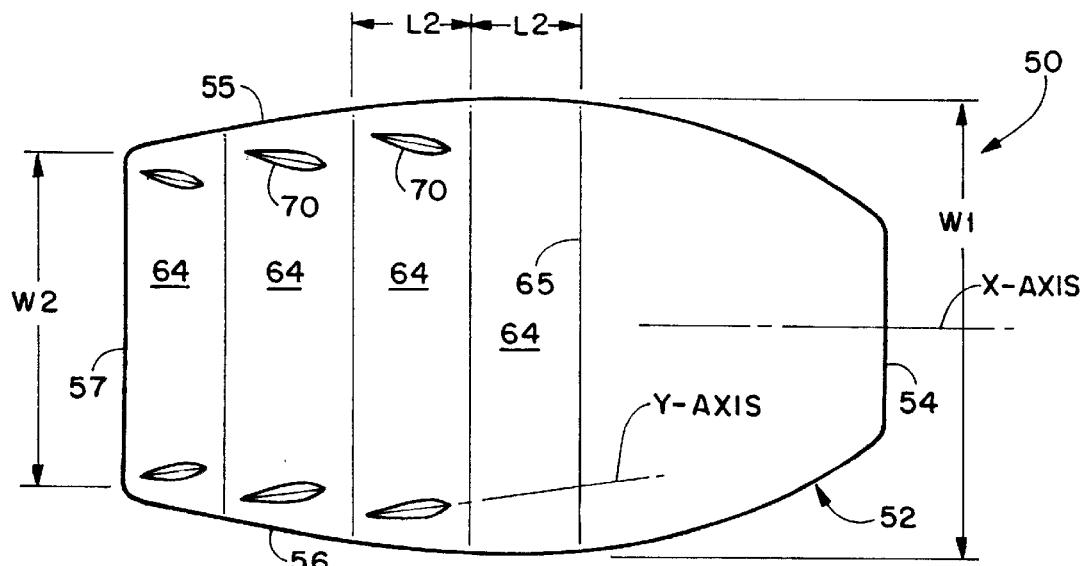
FIG. 6 is a bottom plan view of a first body board embodiment wherein the front edge of the step members is a straight line extending substantially perpendicular to the longitudinal axis of the body board.

The novel watersport boards will now be described by referring to FIGS. 1–9 of the drawings.

In FIGS. 1 and 2, a surfboard 20 is illustrated having a body member 18 having a front tip 21, a right edge or rail 22, a left edge or rail 23 and a rear end 24. Body member 18 has a top surface 26 and a bottom surface 27. A plurality of fins 30 extend downwardly from bottom surface 27 of body member 18. Body member 18 has a length L1 in the range of 4–12 feet. It has a width W1 at its widest point and W1 is in the range of 1–3 feet. It also has a width W2 at its rear end and W2 is in the range of 0–20 inches. Body member 18 is made of material having a specific gravity less than that of water so that it floats on water.

A plurality of step members 34 are formed in bottom surface 27. These steps would be in the rear sixty percent of the length of the body member 18. Each step member has a length L2 and L2 is in the range of 1–24 inches. Each step 34 also has a front edge 36 and a rear edge 38. Each step also has a front wall 40 having a height H1 and H1 is in the range of 0.1–2.0 inches.

The front edge 36 in the embodiment illustrated in FIGS. 1 and 2 shows that it extends along a straight line substantially perpendicular to the longitudinally extending X-axis of body member 18. FIGS. 1 and 2 also illustrate that it is not absolutely necessary that there be a strake 44 or a pair of laterally spaced stakes 44 on each of the step members 34. An alternative embodiment is illustrated in FIG. 3 and it shows that the front edge 36' of the step members 34 has a concave curvature with respect to the rear end 24 of the surfboard 20'.

The strakes 44 are illustrated in FIGS. 1–3 positioned adjacent the respective left and right edges of body member 18 of the surfboard. FIG. 4 is an enlarged view showing one of the strakes 44 and indicating that it has a Y-axis that is toed in at an acute angle A toward the longitudinally extending X-axis 1. Each of the strakes has a length L3, a width W3 and a height H3. L3 is in the range of 1–24 inches, W2 is in the range of 0.1–1.0 inches and H3 is in the range of 0.1–1.5 inches.

FIG. 5 is a cross sectional view taken along lines 5—5 of FIG. 4. It shows that body member 18 has a foam core 46 covered by a fiberglass layer 47.

Figure 7:
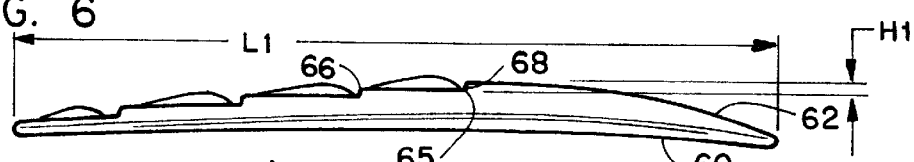
FIG. 7 is a left side elevation view of the body board illustrated in FIG. 6.

The watersport board illustrated in FIGS. 6 and 7 is a body board 50 having a body member 52. Body member 52 has a front end 54, a right edge or rail 55, a left edge or rail 56 and a rear end 57. It also has a longitudinally extending X-axis, a top surface 60 and a bottom surface 62. Body member 52 has a length L1, a width W1 at its widest point and a width W2 at its rear end. L1 is in the range of 20–60 inches, W1 is in the range of 1–3 feet and W2 is in the range of 1–3 feet. Body member 52 is made of material having a specific gravity less than that of water so that it floats on water.

Figure 8:
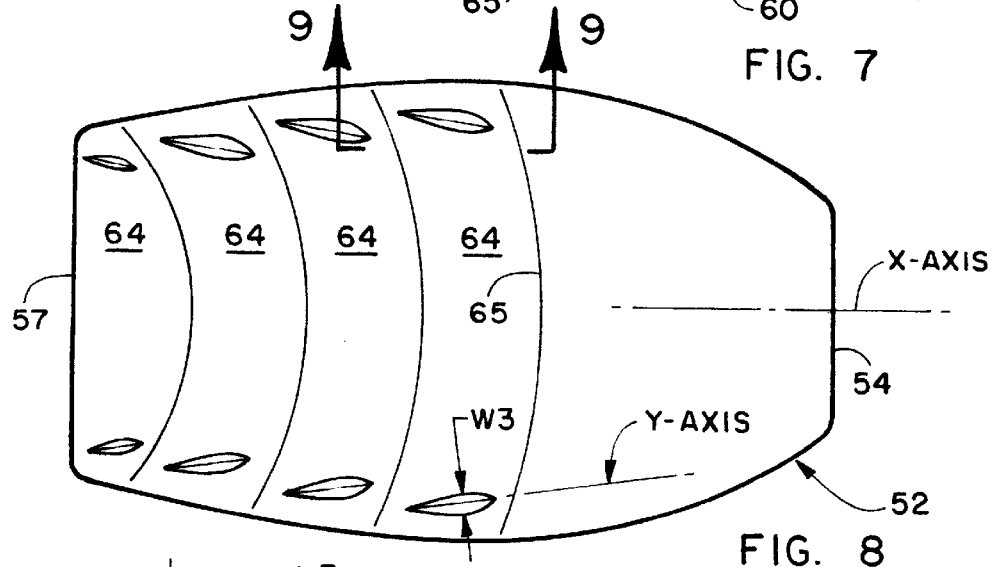
FIG. 8 is a bottom plan view of an alternative embodiment of the body board showing the front edge of the step members having a concave curvature with respect to the rear end of the body board.
Figure 9:
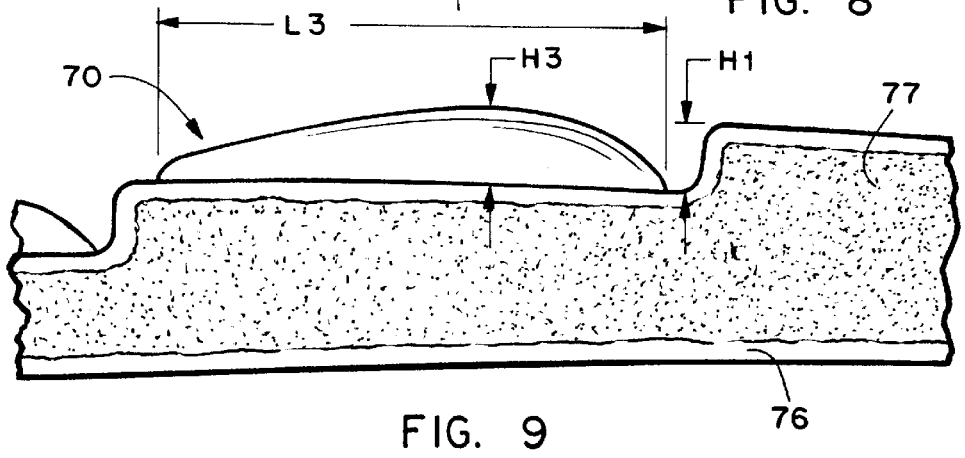
FIG. 9 is a cross sectional view taken along lines 9—9 of FIG. 8.

A plurality of step members 64 are formed in bottom surface 62 and each step member has a front edge 65 and a rear edge 66. Each step member also has a front wall 68. The step members 64 are located in the rear sixty percent of the length of the body member 52. The length L2 of the step members is in the range of 1–24 inches. The height H1 of the front walls 68 is in the range of 0.1–2.0 inches. In the embodiment illustrated in FIGS. 6 and 7, the front edge 65 is a straight line that extends substantially perpendicular to the longitudinally extending X-axis. In the embodiment illustrated in FIG. 8, the front edge 65' of the step members 64 has a concave curvature with respect to the rear end 57 of body member 52. The strakes 70 as seen in FIGS. 6–8 are best understood by referring to FIG. 9. It shows that body member 52 has a foam core 77 covered by a fiberglass layer 76. Each strake has a length L3, a width W3 and a height H3. L3 is in the range of 1–24 inches, W3 is in the range of 0.1–1.0 inches and H3 is in the range of 0.1–1.5 inches. The strakes 70 have a longitudinally extending Y-axis. The strakes 70 could be mechanically secured to the bottom surface of the body boards or they could be adhered thereto by a proper adhesive. The strakes themselves are preferably be made of a plastic material.

What is claimed is:

1. A rideable wave propelled watersport board further comprising:

an elongated body member having a front tip, a left edge, a right edge, a rear end, a top surface, a bottom surface, a longitudinally extending X-axis, a length L1, a width W1 at the widest point of said body member, a width W2 adjacent said rear end; said body member having a specific gravity less than that of water so that said body member floats on water;

a plurality of longitudinally spaced steps on said bottom surface of said body member; said steps being located in the rear sixty percent of said length L1 of said body member; each step having a front edge, a rear edge, a front wall and a longitudinal length L; each of said front walls having a height H1;

a pair of laterally spaced strakes extending downwardly from at least one of said steps on said bottom surface of said body member;

at least one fin extending downwardly from said bottom surface of said body member; and said body member being a surfboard.

2. A rideable wave propelled watersport board as recited in claim 1 wherein each of said strakes has a length L3, a width W3 and a height H3; L3 is in the range of 1–24 inches; W3 is in the range of 0.1–1.0 inches; and H3 is in the range of 0.1–1.5 inches.

3. A rideable wave propelled watersport board as recited in claim 1 wherein one strake of said pair of laterally spaced strakes is positioned adjacent said left edge of said body member and said other strake of said pair is positioned adjacent said right edge of said body member.

4. A rideable wave propelled watersport board as recited in claim 1 wherein each of said strakes has a longitudinally extending Y-axis and said Y-axis is toed-in inwardly toward said X-axis.

5. A rideable wave propelled watersport board as recited in claim 1 wherein each of said strakes has a longitudinally extending Y-axis and said strakes are canted outwardly from said center of said board member.

6. A rideable wave propelled watersport board as recited in claim 1 wherein L1 is in the range of 4–12 feet.

7. A rideable wave propelled watersport board as recited in claim 6 wherein W1 is in the range of 1–3 feet.

8. A rideable wave propelled watersport board as recited in claim 7 wherein W2 is in the range of 0–20 inches.

9. A rideable wave propelled watersport board as recited in claim 1 wherein L2 is in the range of 1–24 inches.

10. A rideable wave propelled watersport board as recited in claim 1 wherein said front edge of said steps extends substantially along a straight line substantially perpendicular to said X-axis.

11. A rideable wave propelled watersport board as recited in claim 1 wherein said front edge of said steps extends substantially along a concave line with respect to said rear end of said body member.

12. A rideable wave propelled watersport board as recited in claim 11 wherein H1 is in the range of 0.1–2.0 inches.

13. A rideable wave propelled watersport board further comprising:

an elongated body member having a front tip, a left edge, a right edge, a rear end, a top surface, a bottom surface, a longitudinally extending X-axis, a length L1, a width W1 at the widest point of said body member, a width W2 adjacent said rear end; said body member having a specific gravity less than that of water so that said body member floats on water;

a plurality of longitudinally spaced steps on said bottom surface of said body member; said steps being located in the rear sixty percent of said length L1 of said body member; each step having a front edge, a rear edge, a front wall and a longitudinal length L2; each of said front walls having a height H1;

a pair of laterally spaced strakes extending downwardly from at least one of said steps on said bottom surface of said body member;

at least one fin extending downwardly from said bottom surface of said body member; and said body member being a body board.

14. A rideable wave propelled watersport board as recited in claim 13 wherein each of said strakes has a length L3, a width W3 and a height H3; L3 is in the range of 1–24 inches; W3 is in the range of 0.1–1.0 inches; and H3 is in the range of 0.1–1.5 inches.

15. A rideable wave propelled watersport board as recited in claim 13 wherein one strake of said pair of laterally spaced strakes is positioned adjacent said left edge of said body member and said other strake of said pair is positioned adjacent said right edge of said body member.

16. A rideable wave propelled watersport board as recited in claim 13 wherein each of said strakes has a longitudinally extending Y-axis and said Y-axis is toed-in inwardly toward said X-axis.

17. A rideable wave propelled watersport board as recited in claim 13 wherein each of said strakes has a longitudinally extending Y-axis and said strakes are canted outwardly from said center of said board member.

18. A rideable wave propelled watersport board as recited in claim 13 wherein L1 is in the range of 20–60 inches.

19. A rideable wave propelled watersport board as recited in claim 18 wherein W1 is in the range of 1–3 feet.

20. A rideable wave propelled water sport board as recited in claim 19 wherein W2 is in the range of 1–3 feet.

21. A rideable wave propelled watersport board as recited in claim 13 wherein L2 is in the range of 1–24 inches.

22. A rideable wave propelled watersport board as recited in claim 13 wherein said front edge of said steps extends substantially along a straight line substantially perpendicular to said X-axis.

23. A rideable wave propelled watersport board as recited in claim 13 wherein said front edge of said steps extends substantially along a concave line with respect to said rear end of said body member.

24. A rideable wave propelled watersport board as recited in claim 13 wherein H1 is in the range of 0.1–2.0 inches.

* * * * *